Patented July 4, 1939

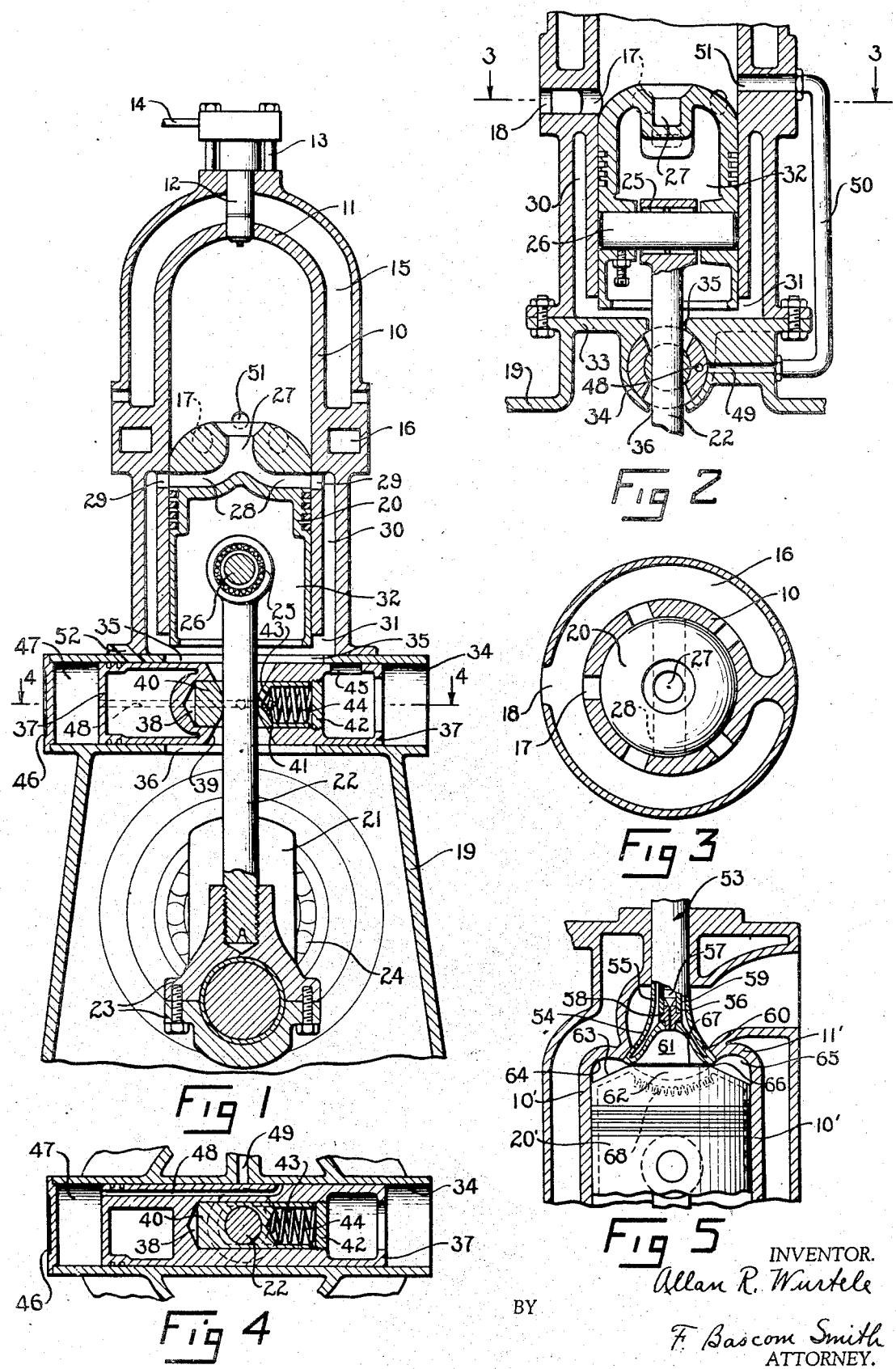

2,164,439

UNITED STATES PATENT OFFICE 2,164,439

INTERNAL COMBUSTION ENGINE

Allan R. Wurtele, Mix, La.

Application June 29, 1937, Serial No. 150,888

5 Claims. (Cl. 123—74)

This invention relates to internal combustion engines and more particularly to engines of the reciprocating piston type which operate on a two-stroke cycle principle.

In two-cycle engines heretofore provided, the maximum power obtainable, the efficiency of operation and the maximum speed have been materially limited by the inability to provide suitable and practical means which are simple and inexpensive for properly scavenging the engine cylinders during the short interval of time available for this purpose, particularly when the engine is operating in its upper range of speeds. Difficulty has also been experienced in supplying a full, fresh charge of a combustible mixture to the cylinders after each power stroke of the pistons therein.

It is accordingly an object of the present invention to provide a two-stroke cycle, internal combustion engine which will operate efficiently over a wide range of speeds and which may be operated at higher speeds than similar engines heretofore provided without diminution of available power.

Another object of the invention is to provide a novel internal combustion engine wherein thorough scavenging of a cylinder after each power stroke of the piston therein is insured.

A further object is to provide novel means for separating the crankcase of an engine from the lower ends of the cylinders in a substantially airtight manner, whereby said engine may be operated on a two-stroke cycle without polluting the incoming charge with oil vapors which are present in the crankcase.

Another object is to provide novel means for supercharging the cylinders of an internal combustion engine.

Still another object is to provide a precombustion chamber, solid fuel injection engine wherein novel means are provided for cooling the walls of said chamber.

A still further object is to provide an internal combustion engine wherein the combustion supporting medium is introduced into the power cylinder in a novel manner.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference being primarily had for this latter purpose to the appended claims.

In the drawing, wherein like reference characters refer to like parts throughout the several views, Fig. 1 is a sectional end view with parts broken away showing one cylinder of an engine embodying one form of the present invention;

Fig. 2 is a sectional side elevation, with parts broken away, the section being taken at right angles to the section of Fig. 1;

Fig. 3 is a cross section taken substantially on line 3—3 of Fig. 2;

Fig. 4 is a sectional view with parts broken away, the section being taken substantially on line 4—4 of Fig. 1; and, Fig. 5 is an end elevation, partly in section and with parts broken away, showing a portion of one cylinder of an engine and illustrating a second embodiment of the invention.

The invention is illustrated, by way of example, in the accompanying drawing as being embodied in a two-cycle solid fuel injection engine, but it will be apparent that the various novel features of the same may be employed in engines burning other types of fuel and operating on the four-cycle principle. In the embodiment shown in Figs. 1 to 4, inclusive, the engine comprises one or more cylinders 10, each having an integral, dome-shaped cylinder head 11 through which a centrally disposed fuel injection nozzle 12 extends. Said nozzle may be secured to the cylinder head by any suitable means, such as stud bolts 13, and measured quantities of fuel may be pumped therethrough into the power cylinder by a suitable pump (not shown) through conduit 14.

A cooling chamber 15, in which any suitable cooling medium may be circulated, is provided around the upper end of cylinder 10 and in cylinder head 11, and an exhaust gas passage 16, which extends substantially around the cylinder and has communication with the combustion chamber therein through a plurality of circumferentially disposed ports or openings 17 in the cylinder wall, is also provided intermediate the ends of said cylinder. Passage 16 of each cylinder may be connected to a common exhaust manifold (not shown) through an opening 18 (Fig. 2) or, if desired, an exhaust manifold may be mounted on both sides of the engine and connected to chambers 16 through suitable connections. Cylinders 10 may be secured to the upper surface of a frame 19, the lower portion of which may constitute a crankcase.

The opening and closing of exhaust ports 17 are controlled by a novelly constructed piston 20 which is adapted to be reciprocated in cylinder 10 by a crankshaft 21 to which said piston is operatively connected by a connecting rod 22 and a two-part bearing collar 23, said rod having threaded or other suitable detachable engagement with said collar for a purpose to appear hereafter. Crankshaft 21 is preferably mounted in frame 19 on ball or roller bearings 24, and an anti-friction bearing 25 is also provided between the upper end of the connecting rod and wrist-pin 26 to thereby reduce frictional resistance to a minimum. The upper surface of piston 20 is preferably dome-like to correspond to the contour of the inner wall of cylinder head 11 and serves to direct the flow of exhaust gases in a novel manner, to appear more fully hereafter, when the piston is at the bottom of its stroke, as seen in Figs. 1 and 2.

In order to obtain thorough scavenging of cylinder 10 and the introduction of a full, fresh charge of a combustion supporting medium, such as air, into said cylinder after each power stroke of piston 20, novel means are provided for supplying said medium to the cylinder in such manner that the burned gases are quickly driven out through ports 17, the flow of said gases being natural and continuous so that there is little or no mixing of the burned gases with the new charge. In the embodiment of Fig. 1, fresh air is admitted centrally of cylinder 10 and at the bottom of the combustion chamber by providing a central opening 27 and radial passages 28 in the top of piston 20, said radial passages being adapted to register with ports 29 in the wall of cylinder 10 when said piston is at or near the bottom of its stroke and, hence, connect the cylinder combustion chamber with an annular chamber 30 which is in constant communication, through a slot 31, with space 32 in the bottom of cylinder 10 below piston 20.

For the purpose of insuring the rapid discharge of the exhaust gases from cylinder 10 in the short time interval during which ports 17 and 29 are uncovered by piston 20, the fresh charge is preferably under some pressure, said charge being compressed, in the embodiment shown, in space 32 by the down or power stroke of said piston. To accomplish this compression, novel means are provided for segregating space 32 from the atmosphere or the engine crankcase and for admitting air thereto at proper time intervals with respect to the position of the power piston. In the form shown, said means comprise the flat upper surface 33 (Fig. 2) of frame 19 and a cylinder 34 depending from said surface and extending laterally across the engine, the longitudinal axis of said cylinder preferably being horizontal and intersecting the axis of cylinder 10 at right angles. The upper and lower walls of cylinder 34 are slotted, as at 35 and 36, respectively, to provide for angular movement and reciprocation of connecting rod 22, which extends therethrough, during the rotation of crankshaft 21.

A novelly constructed piston valve 37 constituting sealing means is slidably mounted in cylinder 34 and cooperates in a novel manner with connecting rod 22 whereby space 32 is rendered substantially air tight and control of the entrance of air to said space is effected. As shown, piston 37 has an axially extending bore 38 therein, the latter extending slightly beyond the longitudinal center of the piston and having a diameter somewhat greater than the diameter of connecting rod 22 and a centrally disposed, vertically extending, diametrical bore 39, the outer edges of which are bevelled outwardly to permit angular movement of the connecting rod which extends therethrough. A substantially air-tight seal is maintained around rod 22 by a member 40 slidably mounted in bore 38 and having a diametrical opening 41, the opposed walls of which are so curved as to engage rod 22 entirely around the periphery thereof for all angular positions of the same. Member 40 may be readily inserted in bore 38 from the right-hand end of cylinder 34, as viewed in Fig. 1, and held therein by a plug 42 threaded into the open end of the bore. Preferably, member 40 is counterbored, as at 43, and a coil spring 44 is interposed between said member and plug 42 to hold the former in substantially air-tight engagement with rod 22 and, hence, compensate for wear.

The admission of air to space 32 is controlled by piston 37, which functions as a valve when reciprocated by the lateral component of the movement of connecting rod 22. As best seen in Fig. 1, the right-hand end of cylinder 34 is open and the corresponding end of piston 37 is hollow. The wall of the hollow portion of piston 37 is provided with an opening or port 45 which is adapted to register with slot 35, said port being preferably so positioned as to register with slot 35 during the major portion of the up stroke of piston 20, i. e., to open as soon as ports 17 and 29 are closed by piston 20 and to close as said piston approaches top dead center, thereby permitting a fresh charge of air from atmosphere to be drawn into the space in cylinder 10 below the power piston. If desired, a suitable screen may be provided across the open end of cylinder 34 to filter and clean the incoming air.

The left end of cylinder 34 and piston 37 are utilized in the embodiment of Fig. 1 as a compressor or pump for supercharging cylinder 10 and, to this end, a cover or end plate 46 is secured to cylinder 34 to form a chamber 47, and a longitudinally extending passage 48, one end of which communicates with chamber 47, is provided in the wall of piston 37 (Fig. 4). A radially extending portion of said passage at the other end thereof is adapted to register with a bore 49 in frame 19 as piston 37 approaches its left-hand position, and said bore is, in turn, connected by any suitable means, such as a conduit 50, to cylinder 10 at a point 51 above the plane of the upper edges of exhaust ports 17. A port 52 (Fig. 1) is provided for the admission of air to chamber 47, the opening and closing of said port being controlled by piston 37. If desired, a one-way check valve may be provided in end wall 46, for example, in lieu of port 52.

In the operation of the above-described engine, starting with the piston in the position shown in Fig. 1, crank shaft 21 rotates in a clockwise direction to move piston 20 upwardly and piston valve 37 to the left, the latter being moved by the lateral movement of connecting rod 22. When piston 20 has moved upwardly a sufficient distance to close ports 17 and 29, passage 48 will come into register with bore 49 to thereby admit compressed air from cylinder chamber 47 to cylinder 10 and, hence, supercharge the latter, and port 45 will register with slot 35 to admit air from atmosphere to space 32. When the crank to which rod 22 is connected reaches a horizontal position, piston valve 37 will begin to move to the right and, as piston 20 approaches top dead center, port 45 will move out of register with slot 35 and, hence, confine a charge of fresh air in space 30, 32 which air is effective to cool the crown of piston 20 which includes the precombustion chamber 27, 28.

A charge of fuel is then injected through nozzle 12 and is started burning by the heat of the air in cylinder 10 which was compressed therein during the upward movement of piston 20. It will be noted that the fuel charge is injected into opening 27 in the piston and that the burning thereof is begun in the precombustion space defined by passages 28 and opening 27. The expansion of the burning gases is effective to drive piston 20 downwardly and piston valve 37 continues to move to the right until crank 21 again reaches a horizontal position. During this time, port 52 is uncovered and a fresh charge of air is admitted to chamber 47, said charge being compressed as piston 37 moves to the left again during the next 180° of rotation of crankshaft 21.

As piston 20 nears the bottom of its power stroke, exhaust ports 17 and inlet ports 29 are uncovered whereupon the air in chamber 32 which was compressed by the downward movement of piston 20 rushes through passages 28 and 27 and upwardly through the center of cylinder 10. This flow of the fresh gases of combustion is effective to drive the burned gases in the center of the cylinder upwardly, around the curved contour of cylinder head 11, and downwardly in an annular stream along the cylinder walls. This annular stream strikes the curved sides of the crown of piston 20 and is deflected thereby through exhaust ports 17 into passage 16 and, hence, through opening 18 into an exhaust manifold or to atmosphere. After crank 21 passes bottom center, piston 20 again begins to move upwardly and the cycle of operation is repeated for each revolution of the crankshaft.

In Fig. 5, the engine is illustrated in its application to a two-cycle, valve-in-head engine. In the embodiment shown, a cylinder 10' is provided with an integral cylinder head 11' having a centrally disposed exhaust port controlled by a valve 53. The latter, which is only partially shown, has an enlarged head portion 54 and a hollow stem 55 in which fuel injection means including a barrel 56, a valve 57, and a nozzle 58 are provided. Valve 53 may be actuated by any suitable well-known mechanism. The details of the fuel injection means and valve actuating mechanism have been omitted since the same do not, per se, constitute any part of the present invention.

An annular space 59 is formed in valve 53 between the walls of stem 55 and fuel barrel 56 through which air may be circulated. The air is effective to cool the valve and is preferably discharged through ports 60 for the purpose of assisting in the scavenging of cylinder 10' by setting up an ejector action when valve 53 is in open position. It will be understood that the lower portion of the embodiment of Fig. 5 is of substantially the same construction as illustrated in Fig. 1, except that exhaust ports 17 and passage 16 are eliminated, the same being replaced by valve 53. The compressed air for use in valve cooling chamber 59 may be obtained from auxiliary cylinder chamber 47, if desired. Preferably, air is discharged into said cooling chamber only during the scavenging period, i. e., while valve 53 is in open position.

The lower or head portion 54 of valve 53, the top of a piston 20' in cylinder 10', and the walls of said cylinder are so formed as to provide novel main- and pre-combustion chambers, whereby high turbulence and, hence, rapid and complete combustion of the fuel charge may be obtained. The novel construction is also such that all of the force generated by the expansion of the burning charge is expended in driving the piston downwardly to do useful work. In the form shown, the large bell-shaped head 54 of valve 53 is provided with a partially spherical cavity or recess 61 having a circular cross-section, the lower end or mouth of said recess having the larger cross-section and being in open communication with cylinder 10'. A sphere-like recess 62 having a maximum width substantially equal to the diameter of the mouth of recess 61 is preferably provided in the top center of piston 20', said recesses being adapted to cooperate when the piston is at the top of its stroke to form a precombustion chamber 61, 62.

The upper peripheral margin of piston 20' is preferably bevelled, as at 63, and cooperates with the rounded or curved upper wall 64 of cylinder 10' to form an annular main-combustion chamber 65. The bevel 63 starts at a point adjacent the edge of recess 62 thereby leaving an annular rib 66 between the bevelled portion and said recess, which rib closely approaches the lower periphery of valve head 54 when the piston is at top dead center and forms a narrow annular passage 67 connecting precombustion chamber 61, 62 and main-combustion chamber 65. It will be noted that the lower wall of the precombustion chamber, i. e., the wall of recess 62, is adapted to be cooled by the air entering the bottom of the cylinder through port 45 and slot 35 (Fig. 1). Preferably, a plurality of fins 68 are provided on the lower face of the crown of piston 20' in order to increase the surface contacted by the cooling air and, hence, the heat conduction from the precombustion chamber wall.

In the operation of the embodiment of Fig. 5, the upper edge of piston 20', when the latter is at the bottom of its stroke, is below inlet ports 29, thereby permitting air from chamber 30, 32 to enter cylinder 10' and drive the burned gases out through the port in cylinder head 11', valve 53 being in open position at this time. The upward movement of piston 20' compresses the air in cylinder 10' and fuel is injected through nozzle 58 into precombustion chamber 61, 62 when the piston nears the top of its stroke. The fuel is started burning in the precombustion chamber and expands into main-combustion chamber 65. The pressure of the expanding gases drives the piston downwardly and the cycle is repeated.

There is thus provided a novel internal combustion engine of the two-stroke cycle type which is so constructed that high speed and efficient operation may be obtained, said engine embodying novel means for controlling the inlet of a combustion supporting medium to the power cylinders, novel means for scavenging said cylinders after each power stroke of the pistons therein, and novel means for supercharging said cylinders. Additionally, a novel pre-combustion chamber engine embodying novel means for cooling the walls of the precombustion chamber is provided. Novel means are also provided for forming an air-tight chamber below the piston of an internal combustion engine and for controlling the admission of air thereto.

Although only two embodiments of the invention have been illustrated and described in detail, it is to be expressly understood that the same is not limited thereto but that various changes may be made, particularly in the design and arrangement of parts illustrated, as will now be apparent to those skilled in the art, without departing from the spirit and scope of the invention. For a definition of the limits of the invention, reference is had primarily to the appended claims.

What is claimed is:

1. In apparatus of the class described, a power cylinder having a dome-shaped head and having inlet and exhaust ports in the walls thereof, a piston having a dome-shaped crown slidably mounted in said cylinder, said piston being adapted to open and close said exhaust ports and having a passage opening into the center of said cylinder and adapted to register with said inlet ports when the piston is near the bottom of its stroke, a crankshaft, a connecting rod operatively connecting said piston and crank-shaft, means including a piston valve forming an air-tight chamber in said cylinder below said piston, said piston valve being adapted to be reciprocated transversely of the engine by the lateral component of the movement of said connecting rod, means connecting said chamber and said inlet ports whereby air under pressure is admitted to said cylinder above said piston and centrally of the former when the latter is at the bottom of its stroke, an auxiliary cylinder in which air is compressed by movement of said piston valve, and means connecting said auxiliary cylinder and said power cylinder during the upward movement of said piston immediately after said exhaust ports are closed by the latter whereby the power cylinder is supercharged.

2. In an internal combustion engine, a power cylinder, a piston operable in said cylinder, a crankshaft, a connecting rod operatively connecting said piston and crankshaft, and means for forming a substantially air-tight chamber in the bottom of said cylinder below said piston, said means comprising a transverse cylinder having diametrically disposed slots therein to permit operation of the connecting rod, a piston in said transverse cylinder having an axial bore therein and a diametrically extending opening for the passage of said connecting rod, a plunger in said bore having an opening with curved walls engaging said connecting rod entirely around the periphery thereof and resilient means for resisting relative movement of said second-named piston and said plunger.

3. In an internal combustion engine, a power cylinder, a crankshaft, a connecting rod connecting said piston and crankshaft, and means for forming an air-tight chamber in the bottom of said cylinder below said piston comprising a transverse cylinder, a piston valve therein and a plunger slidably mounted in said valve, said transverse cylinder, piston valve and plunger having registering openings therein for the passage of said connecting rod and resilient means for holding said plunger in engagement with said rod.

4. In an internal combustion engine, a power cylinder having inlet and exhaust ports, a power piston operable in said cylinder, said piston being adapted to open and close said ports, a crankshaft, a connecting rod operably connecting said piston and crankshaft, means for forming a substantially air-tight chamber in said power cylinder below said power piston, said means including a transverse cylinder and a piston therein adapted to be reciprocated by the transverse component of the movement of said connecting rod, said second-named piston serving as a valve for connecting said chamber to the atmosphere when the power piston is at the top of its stroke and as means for compressing air in one end of said transverse cylinder, means connecting said chamber with certain of said inlet ports below said exhaust port, and means connecting said transverse cylinder to certain of said inlet ports immediately above said exhaust port for admitting compressed air to the power cylinder to supercharge the same, said second-named piston serving as a valve for opening and closing said last-named connecting means and for controlling the connection between said transverse cylinder and atmosphere.

5. In an internal combustion engine a power cylinder, a piston operable in said cylinder, and means for forming an air-tight chamber in the bottom of said cylinder below said piston said means comprising a transverse cylinder, a piston valve therein the latter serving as a valve for connecting said chamber to the atmosphere during the upward movement of the first-named piston, and as means for compressing air in one end of said transverse cylinder, an inlet port in the latter cylinder which is opened by said piston valve when the valve is at one extremity of its stroke, a plunger slidably mounted in said valve, and resilient means for resisting relative movement of said valve and plunger.

ALLAN R. WURTELE.